US009218167B2

(12) United States Patent
Wilson et al.

(10) Patent No.: US 9,218,167 B2
(45) Date of Patent: Dec. 22, 2015

(54) AUGMENTING USER INTERFACE WITH ADDITIONAL INFORMATION

(75) Inventors: Darren P. Wilson, London (GB); Nicholas R. Richards, London (GB); Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/591,742

(22) Filed: Aug. 22, 2012

(65) Prior Publication Data
US 2014/0059567 A1 Feb. 27, 2014

(51) Int. Cl.
*G06F 9/44* (2006.01)
*G06F 9/54* (2006.01)

(52) U.S. Cl.
CPC . *G06F 8/38* (2013.01); *G06F 9/542* (2013.01)

(58) Field of Classification Search
CPC .................................. G06F 8/38; G06F 9/542
See application file for complete search history.

(56) References Cited

U.S. PATENT DOCUMENTS

| 8,656,292 | B2 * | 2/2014 | Sharma | 715/765 |
|---|---|---|---|---|
| 8,881,060 | B2 * | 11/2014 | Chaudhri et al. | 715/835 |
| 2003/0233419 | A1 * | 12/2003 | Beringer | 709/206 |
| 2006/0168549 | A1 * | 7/2006 | Chan et al. | 715/863 |
| 2008/0244442 | A1 | 10/2008 | Veselova et al. | |
| 2010/0161748 | A1 * | 6/2010 | Kojima et al. | 709/206 |
| 2010/0211644 | A1 * | 8/2010 | Lavoie et al. | 709/206 |
| 2010/0287249 | A1 * | 11/2010 | Yigang et al. | 709/206 |
| 2010/0299394 | A1 * | 11/2010 | Jania et al. | 709/206 |
| 2011/0283236 | A1 | 11/2011 | Beaumier et al. | |
| 2012/0023416 | A1 | 1/2012 | Khoo | |
| 2012/0149342 | A1 * | 6/2012 | Cohen et al. | 455/412.2 |
| 2012/0311444 | A1 * | 12/2012 | Chaudhri | 715/716 |
| 2013/0054613 | A1 * | 2/2013 | Bishop | 707/748 |
| 2013/0159426 | A1 * | 6/2013 | Milic-Frayling et al. | 709/206 |
| 2013/0204946 | A1 * | 8/2013 | Forstall et al. | 709/206 |

FOREIGN PATENT DOCUMENTS

| EP | 1777611 A1 | 4/2007 |
|---|---|---|
| EP | 2403225 A1 | 1/2012 |

OTHER PUBLICATIONS

International Search Report and Written Opinion mailed Nov. 22, 2013 for International Application No. PCT/US2013/053831, 11 pages.
International Preliminary Report on Patentability mailed Mar. 5, 2015 for International Application No. PCT/US2013/053831, 8 pages.

* cited by examiner

*Primary Examiner* — Charles E Anya
(74) *Attorney, Agent, or Firm* — Schwabe, Williamson & Wyatt, P.C.

(57) ABSTRACT

Embodiments of methods, systems, and storage medium for enhancing a user interface of an application with additional information are disclosed herein. In one instance, the method may include a computing device detecting an event associated with an application executing on the computing device, a container of a user interface of the application, or at least one object of the container; determining additional information to augment basic information associated with the at least one object of the container of the user interface of the application; and augmenting the basic information of the at least one object in a display of the container with the additional information or one or more indicators corresponding to the additional information. The additional information is associated with the object. Other embodiments may be described and/or claimed.

25 Claims, 5 Drawing Sheets

AUGMENTING USER INTERFACE WITH ADDITIONAL INFORMATION

RELATED APPLICATIONS

This application relates to U.S. application Ser. No. 13/038,824 filed Jun. 18, 2012, by virtue of having common inventorship.

FIELD

Embodiments of the present disclosure generally relate to the field of data processing, and more particularly, to techniques for providing user interfaces.

BACKGROUND

In data processing, most end-user applications have user interfaces. Most user interfaces require user decisions as to how to reach a desired outcome. Typically, a user may go through multiple steps of using available user interface (UI) controls, containers, and/or objects (e.g., provided by a user interface of an application) until the desired outcome may be reached. In current systems, the user may need two types of information to navigate the user interface: information about the application capabilities and information that is needed to carry out the task at hand. The information about the application capabilities may be provided in the application itself. Tooltips are commonly used to give the user a description of the UI capabilities to assist the user in choosing and using particular controls or objects. In order to use tooltips, the user may be required to mouse-over (or hold/flick on touch systems) various available options sequentially. However, tooltips typically do not show previews of expected results of using a corresponding UI control or object.

Information that may be needed to carry out the task at hand may be split across multiple computing resources. For example, the information may be available across multiple windows on a desktop system, or multiple applications on a mobile device. For example, a user may use a flight booking website to book a flight, a calendar program to see his availability, and a Portable Document Format (PDF) reader to review company guidelines for booking a flight on her desktop. Thus, the user may need to either arrange her desktop to make sure that all three windows that contain the information she needs are visible at once, or use window switching mechanisms to switch between the windows. This may prove a cumbersome task.

Further, the user may not know or anticipate the results of the user interface control-related actions until she actually uses a particular interface control or object. As a result, the user may not be able to make informed decisions about the expected results of selecting particular user interface controls or objects. Accordingly, unexpected results or errors may occur as a result of such user interface control/object selections that may negatively affect the user experience with a particular user interface.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
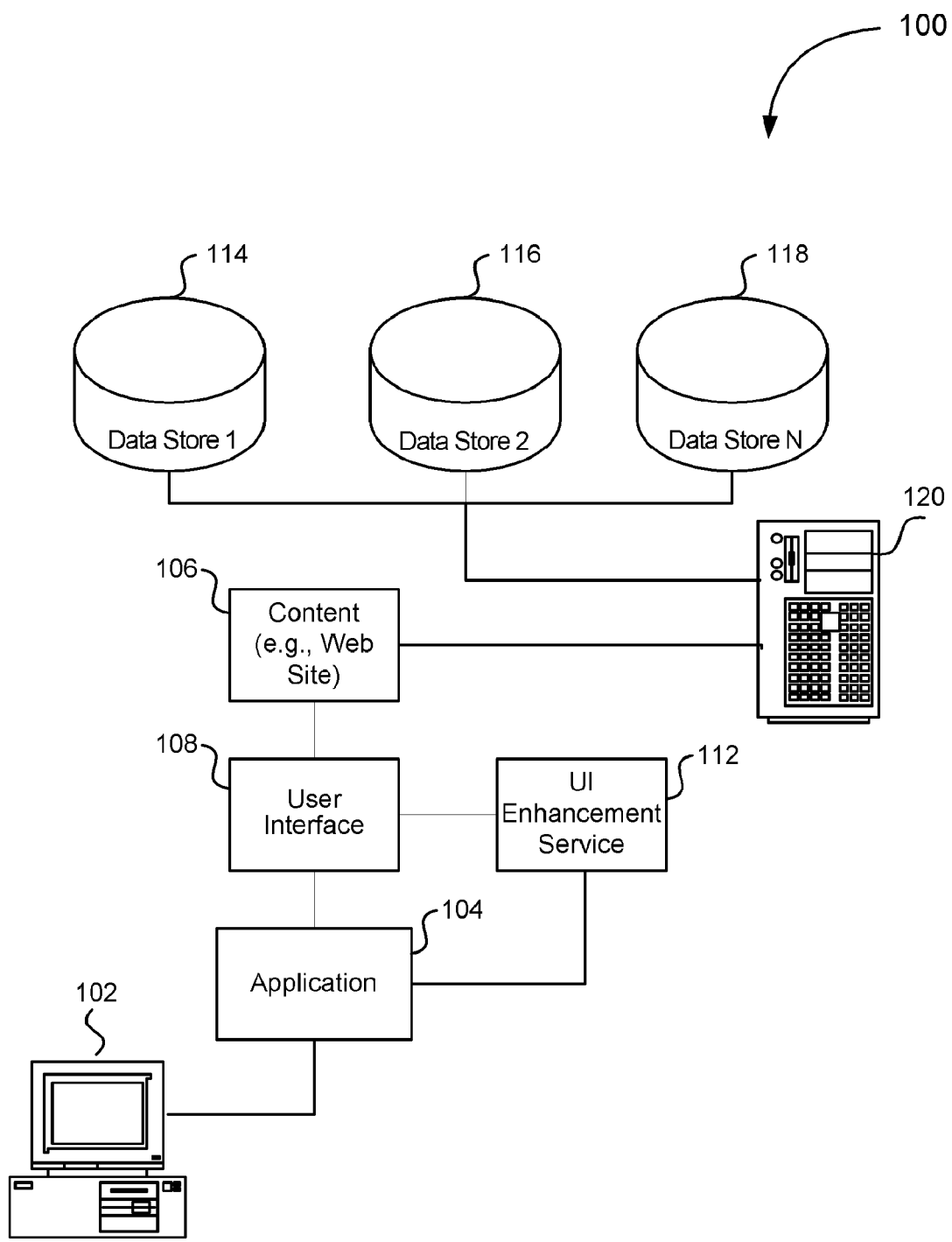
FIG. 1 illustrates an environment in which various embodiments can be practiced in accordance with some embodiments.

Techniques are presented for enhancing user interface of an application executing on a computing device with additional information, e.g., information associated with events pertaining to the application. The additional information with which the user interface may be augmented may inform the user of possible results of user interaction with the application user interface before the interaction occurs. For example, the user may be informed about functionality and/or content associated with containers and/or objects included in the containers, where the containers form, at least in part, the user interface of the application. In another example, the rendered additional information may enable a user to ascertain the outcome of the interaction with a particular object or a container and to make informed decision as to which container or object is the best selectable choice in a particular instance of the user session with the application.

For example, a container or an object of a container may be augmented with additional information associated with the application and provided in response to an event pertaining to the application. The additional information may be provided, for example, in response to an event such as user interactions with the application or content associated with the application and may include data related to a particular function associated with an object of the user interface application, data related to the status or context of the user interface or function associated with the object of the user interface, data related to content (e.g., associated with incoming communications for an application), and the like. In one example, an event causing the user interface enhancement may be ascertained by detecting a movement of a selecting element such as a cursor toward a particular area of the user interface that may be designated for such detection. For example, hovering with a cursor over a particular area proximate to a particular object in a container or a sensing a user's finger or stylus near or over the object in case of a touch-sensitive screen may be indicative of the user intent to select the object. The received input, when detected, may cause subsequent actions leading to the augmentation of one or more objects or containers of the user interface with relevant information as described herein.

The data associated with an object to be accessed may be gathered, visualized, and rendered to the user in association with the object (or container), e.g., to replace, or to add to, existing static definition of the object or container. The data may be visualized by rendering one or more indicators in association with the object or container, which may include images, text, thumbnails, links, changes in visual characteristics of the object or container (e.g., size, location, color scheme, motion, etc.), and the like.

The information for enhancing a user interface may be gathered in a number of different ways. For example, the information may be heuristically determined based on data associated with an event that may cause the user interface enhancement. For example, the information may be discerned from an incoming email message for an email application, such as the message importance, message priority, sender's identity and the like. The information may also include dynamically obtained and processed content and/or context associated with the user interface objects or containers or events causing the user interface enhancement. The information may be produced by obtaining data from the content source data repository where content served for a particular content resource resides or from the content rendered by the content resource (e.g., a Web site) and processing the obtained data to provide the visual indicators associated with objects or containers corresponding to the obtained data.

As described below in greater detail, there may be different types of events causing the enhancement of the user interface with additional information. For example, an application user interface enhancement may be caused by switching from one mode of operation to another from "normal" to "enhanced" mode). In this example, the event may include switching the mode and the information may include data gathered from resources that may be connected to an application or a computing device on which the application executes. One example of a connected resource may be a social networking web site, from which social information associated with particular users of the application may be collected and presented with the enhanced user interface in the "enhanced" mode. Another example of a connected information resource may be a data store associated with a server accessible by a computing device which hosts the application or a collection of data (e.g., multiple files) stored on a different computing device and accessible by the computing device. As another example, the information may include resource utilization of an execution environment of the application. As yet another example, the application may initiate an event causing the user interface enhancement. For example, if the application may know (e.g., determine, or receive an appropriate notification) that additional information is available, it may switch to that "enhanced" mode without having to take input from the user.

FIG. 1 shows an illustrative environment 100 in which the aspects of user interface enhancement described herein may be implemented in accordance with some embodiments. In an embodiment, the environment 100 of FIG. 1 may be utilized to enhance the user interface provided by an application 104 (e.g., an email application or a music player application), which renders content (e.g., a Web site) 106 via a user interface 108 using a UI enhancement service 112 described herein. The enhancement may include additional information to augment the basic information provided by application 104 for the objects and/or containers included in the user interface of the application. As used herein, a container is a type of objects that contain other objects. An object may or may not contain other objects. It is to be understood that the UI enhancement service 112 may comprise a number of various implementations, including, but not limited to, a software application component executed on a computing device, such as a client device 102 or a Web server 120. In one embodiment, the service 112 may be offered as a part of remote computing services that together make up a cloud computing platform, offered over the Internet. The service may be configured to run in a Web server environment, such as a pure Java HTTP Web server environment.

In an embodiment, the environment 100 may include a client computing, device 102 utilized by a user for interaction with electronic entities that provide content. Content may be accessed by the client computing device 102 through the application 104, e.g., a browser. The content may be stored in one or more remote content data stores 114, 116, and 118 and may be utilized by merchants, Web sites, or other entities in order to provide users an opportunity to search for, and view, content by navigating to a Web site 106 operated, for example, through a Web server 120. The data stores may be accessible (e.g., with a search engine) through the Internet or any other type of computer network known in the art. In another example, the data stores 114, 116, 118 may be locally accessible by the device 102. For example, the data stores 114, 116, 118 may include a locally stored address book or other user-associated information.

In an embodiment, a UI enhancement service 112, operating on the device 102, may be configured to, in response to detecting an event, such as a user input or incoming communication, augment objects and/or containers of the user interface 108 with information associated with the object and/or container. For example, when a user interaction with an area proximate to a particular object of the user interface 108 rendered by the application 104 on the client computing device 102 is detected, the data corresponding to the content associated with the object may be assembled, e.g., from one or more data stores 114, 116, 118, and corresponding visual indicators (e.g., an indication of importance or urgency of the items associated with the object) be displayed to the user with association with the object of the user interface 108.

In an embodiment, the UI enhancement service 112 may be implemented as a trusted script, for example, a JavaScript®. In some embodiments, the trusted script may also be implemented as ActionScript®, VBScript®, Java Servlet®, Flash®, JScript® or other scripting languages. In some embodiments, the trusted script 112 may be implemented as an extension (i.e., a plug-in application) to the application 104. In some embodiments, the UI enhancement service (trusted script) 112 may be loaded on a page of the Web site 106 when a user accesses the Web site. In general, the trusted script does not have to be Web site-specific; the script may be provided as a part of a browser or be installed as an extension to a browser. In some embodiments, the UI enhancement service 112 may be provided through an API as part of a middleware framework and may be implemented directly as part of an application or as an independent daemon program providing the enhancements. In yet another embodiment the UI enhancement service 112 may be implemented as independent daemon that does not share a UI framework with the application and only integrates with the windowing system of the underlying operating system.

The trusted script comprising the UI enhancement service 112 may be configured to detect a user interaction with an area proximate to a particular object or container of the user interface 108, access content data stores 114-118, retrieve information associated with the content corresponding to the object or container, process the retrieved content to produce a content summary, and render the processed content with the object or container. In some embodiments, the trusted script may be further configured to adjust the visual properties (e.g., size, color, font, etc.) of the object or container in order to accommodate the processed content summary.

Figure 2:
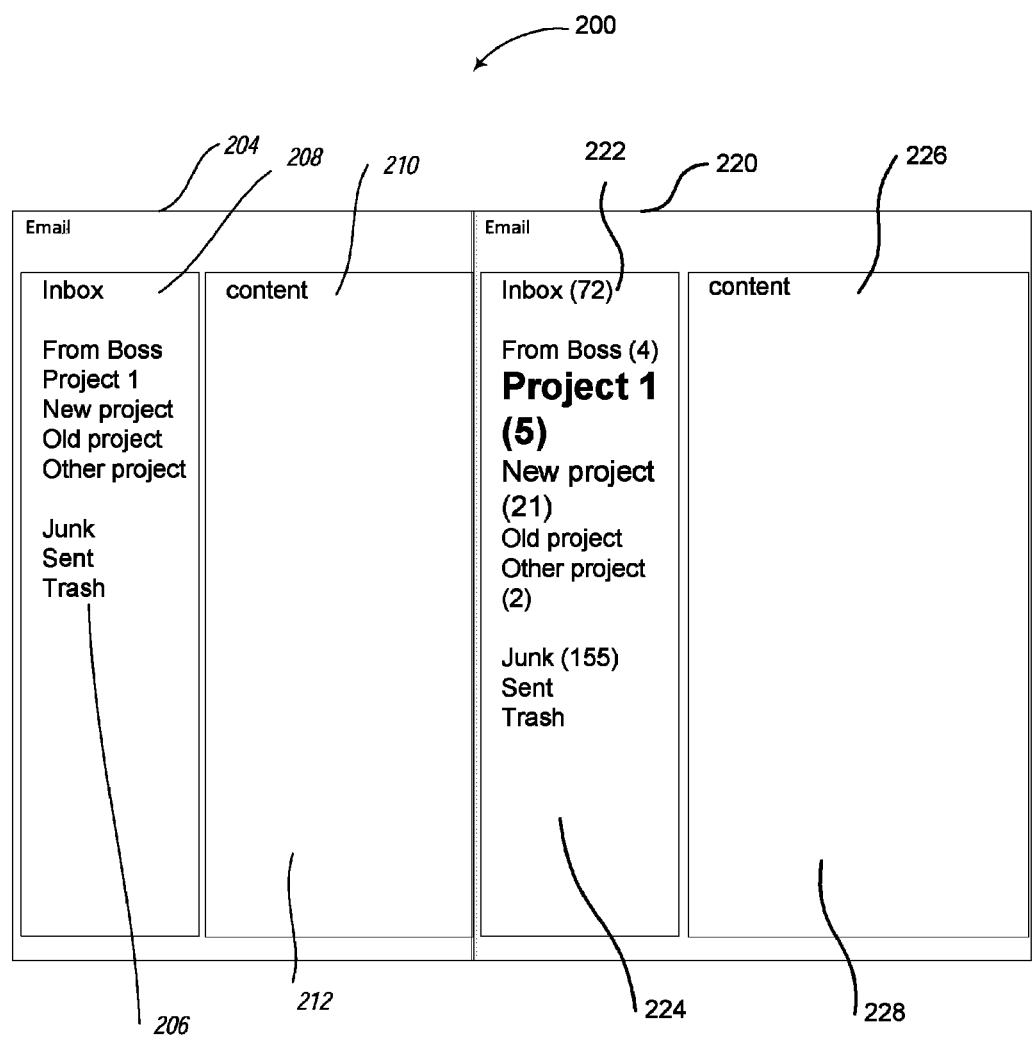
FIG. 2 illustrates example screenshots of a user interface with the user interface objects enhanced in accordance with an embodiment.
Figure 3:
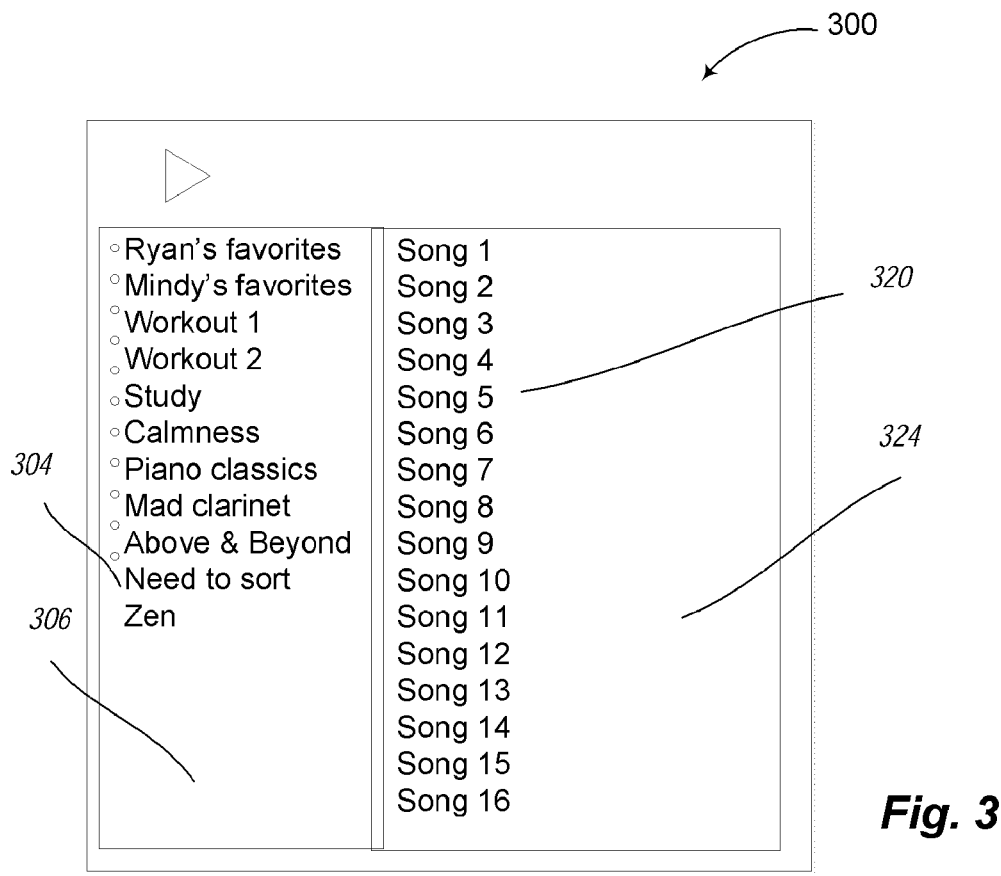
FIGS. 3-4 illustrate other example screenshots of a user interface with the objects of the user interface enhanced in accordance with an embodiment.
Figure 4:
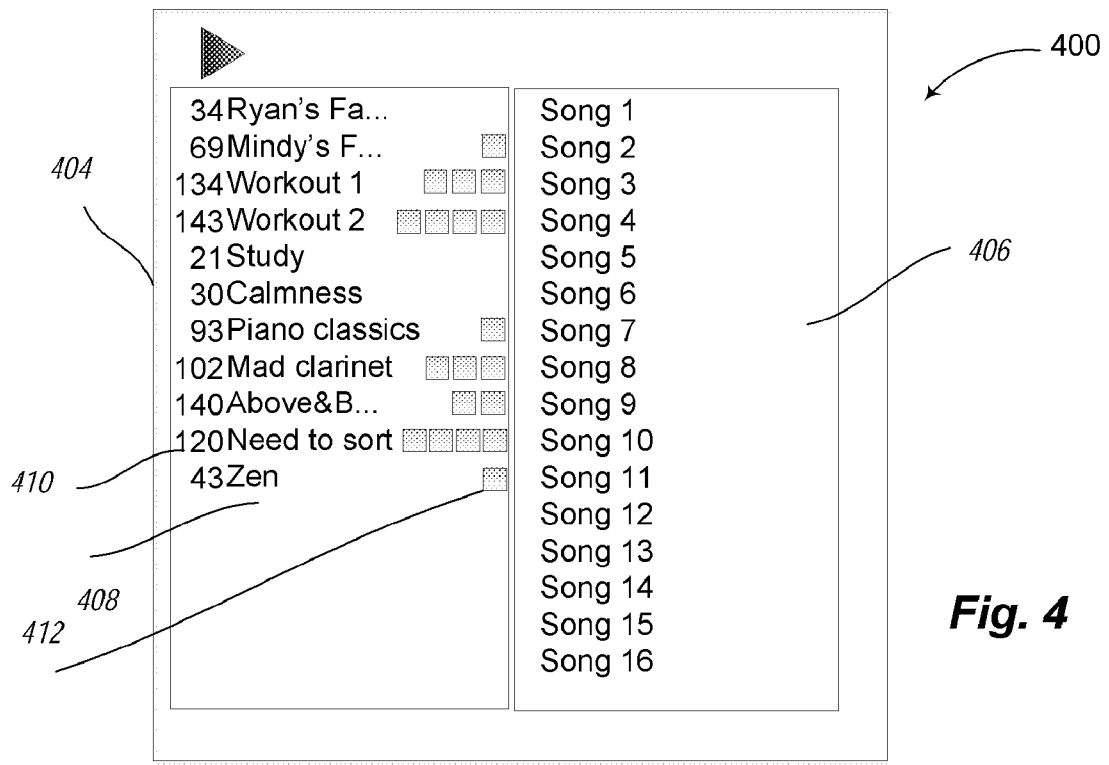

FIGS. 2-4 illustrate various embodiments of user interfaces enhanced by the UI enhancement service. The embodiments illustrated in FIGS. 2-4 do not limit this disclosure to the described embodiments, but merely present different examples of the implementation of the user interface enhancement described herein.

FIG. 2 illustrates an example user interface 200 of an example email application. In embodiments, the example email application may have a "regular" mode and an "enhanced" mode of operation. In the "regular" mode, the application may have a conventional user interface 204, which may render for display different containers, such as folders 206 shown in the left container pane 208. The conventional user interface 204 may also render content 210 in the right container pane 212. As shown, in the "enhanced" mode, the enhanced user interface 220 may display the container folders 222 in the left pane 224, which may have various indicators associated with one or more displayed folders. For example, the indicators may reflect additional information that may be derived from local sources (e.g., cached emails, user's email contacts, and the like) and/or remote sources (e.g., connected resources such as social networking web resources). The additional information may include, for example, read counts per email message pertaining to a folder, the folder priority (e.g., based on the assigned priority in the emails), the declared or implied importance of the folder (e.g., derived from the content of the emails or the sender's relationship with the recipient), the sender's relationship with the recipient (e.g., based on a same last name, number of exchanged messages, length of correspondence, association with a particular organization such as the recipient's workplace, and the like), and so forth. The additional information may be also derived from the subject information included in a subject line of the email message or content information associated with content of the email message. For example, the additional information may be derived from the header information in the email message, and generally, from information about the email that may be kept on the server side.

As shown, some of the folders 222 that include urgent, important, or otherwise distinctive email messages (e.g., messages regarding current, relevant, or important projects) may be highlighted with visual indicators in a number of different ways, such as with emphasized visual properties (e.g., larger font size, weight, color, and the like). Others of the folders 222 that may include less relevant content (e.g., messages of low importance) may be de-emphasized (e.g., with smaller fonts, faded colors, and the like). The right container (pane) 228 may include various content 226, such as email messages included in a particular folder of folders 222 displayed in the left pane 224.

There may be various events that may cause the user interface 200 enhancement. For example, a receipt of an email message with a high level of importance may cause a particular folder (e.g., to which the email belongs) be enhanced with one or more visual indicators as described above. In another example, a receipt of the email message of high importance may cause all folders 222 to be displayed in an "enhanced" mode as shown in the pane 224. In yet another example, a user may interact with the interface 200, for example, by requesting to switch from the "regular" mode indicated by the conventional user interface 204 to the "enhanced" mode indicated by the enhanced user interface 220. In yet another example, accessing the area of the pane 208 proximate to one of the folders 206 (e.g., with a cursor, not shown) may trigger the folder's augmentation with relevant additional information. Accordingly, if a user accesses the area proximate to one of the folders 206 in the pane 208, the UI enhancement service (e.g., referenced by numeral 112 in FIG. 1) may obtain information associated with the folder, process the obtained information, and display the processed information or visual indicators associated with the processed information with the folder. In alternate embodiments, the UI enhancement service may pre-obtain and/or pre-process the information associated with one or more objects (folders) 206 of the container (pane) 208, prior to the user accessing the area proximate to one of the folders 206.

FIGS. 3 and 4 illustrate example user interfaces 300 and 400 of a music player application. The user interfaces 300 and 400 illustrate a "regular" and "enhanced" modes for the application's interface respectively. The objects 304 in the left container pane 306 may have item counts, labels, and icons in a hierarchy. For example, the objects 304 may represent different media items, such as playlists or songs. The objects 320 in the right container pane 324 may represent media items (e.g., songs) associated with one or more objects 320. Thus, in the "regular" playback mode the user may view plain playlists as shown in the panes 306 and 324 of FIG. 3.

In the "enhanced" mode, the objects 320 may be enhanced by using visual indicators or other data that summarize data from the local and/or connected sources. The example user interface 400 shows the example music player application in the "enhanced" mode. The user interface 400 may include two container panes 404 and 406 containing objects, similar to the "regular" mode represented by the user interface 300. As in the example of FIG. 2, the event triggering the "enhanced" mode illustrated by the user interface 400 may be a user-initiated switch from the "regular" to the "enhanced" mode. When the user switches to the "enhanced" mode, the objects 408 that represent the playlists may change to add functional information associated with the playlist, e.g., tempo (beats-per-minute or BPM) and/or other information, such as, for example, social information related to a user associated with a playlist. Generally, the additional information may be obtained from any resource associated with media items on a playlist, for example, metadata associated with a media item on the playlist.

For example, assume a user is going to have a party and is selecting a list of various music items to be played back at the party. Knowing the list of guests and their listening habits from multiple social networks, the playlists may be augmented, for example, with the profile pictures of the guests if the playlist includes songs that the particular guest has as a favorite. Accordingly, the "enhanced" mode of the user interface 400 may include at least some of the objects (playlists) 408 having BPM indicators 410 and additional information 412. The additional information may be obtained from local and/or remote resources, such as address books, social networking resources, and the like. The information may include information about the users—guests of the party, such as user-uploaded or generated images that represent the user, user's preferences, user's tastes in music, and the like. From this information the user may conclude, for example, that the guests like faster and louder songs, and she may focus on those playlists to compile a list of songs for the party according to the guests' tastes.

Figure 5:
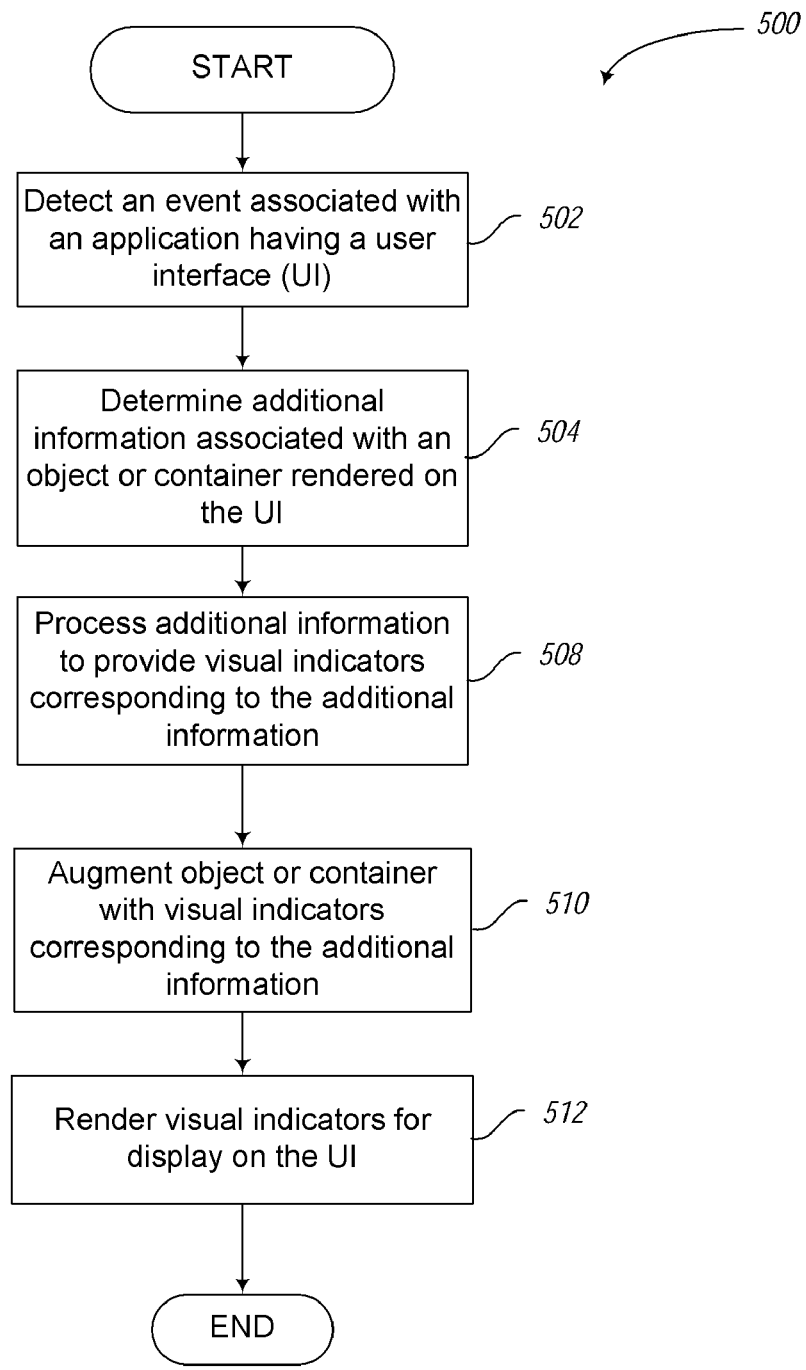
FIG. 5 illustrates a process flow diagram for a user interface enhancement in accordance with an embodiment.

FIG. 5 is a process flow diagram 500 for enhancing a user interface of an application with additional information in accordance with various embodiments. As discussed above, the application may be any type of application configured to provide content and/or services to a user, such as an email application, a music player application, and the like. The process 500 may begin at block 502, where an event associated with the application, which may trigger an enhancement of the user interface of the application, is detected. The detected event may take a number of different forms. For instance, as discussed in the example of the application being an email application in reference to FIG. 2, an event may include receiving an incoming email message, user accessing one of the email folders, switching a user interface view from a "regular" mode to an "enhanced" mode, and the like. In another example, as in the example of the application being a music player application discussed in reference to FIGS. 3-4, the event may include switching the user interface from a "regular" mode to an "enhanced" mode, accessing one of the playlists, and the like.

Generally, different types of events may trigger an enhancement of the user interface of an application with additional information. For instance, in the example of an email application, an event triggering an enhancement of the user interface may be setting a particular date (e.g., a user's spouse's approaching birthday date) on a calendar, from which date all messages associated with the user's spouse (e.g., sent by the user's spouse or anybody having the same last name as the user's spouse) should be considered of high importance and accumulated in a separate folder with corresponding visual indicators (e.g., different font size, different color, and the like). In an example of a user interacting with a route-selecting application, a triggering event may be choosing a route, changing the route, bringing a car to a destination (e.g., parking lot), making a stop, and the like.

In yet another example, the user interface may be augmented in response to a detection of a user interaction of a particular area of the user interface, such as an area in which particular objects are located, or any other designated area. One or more of these objects may be augmented with corresponding additional information in response to the user interaction with the designated area (e.g., moving cursor to the area, entering the area with the arrows on the keyboard, touching the area if the screen is touch-sensitive, and the like). In yet another example, a movement of a selecting element (cursor) toward a particular object of the user interface may be detected and, in response to the detection, the object may be augmented with information associated with the content corresponding to the UI control element.

At block 504, relevant additional information associated with the one or more objects or containers included in the user interface may be determined in the response to the detection that occurred at block 502. The relevant information may include content or context information associated with the content corresponding to the object or container. The relevant information may include a description of the functionality of the object, description of items included in the object, images and social information (e.g., personal data) associated with the user or other users associated with the user of the application, and the like. The information for enhancing the user interface may be gathered in a number of different ways. For example, the information may be heuristically determined based on the user actions or user preferences. The information may be deterministic, static additions to the user interface declared, for example, at coding time. The information may also include dynamically obtained and processed content associated with the user interface object or objects. The manner of creating this dynamically obtained and processed content can be purely algorithmic (e.g., algorithmic evaluation of search results), or based on artificial intelligence concepts like genetic programs or other, adaptive technologies. As discussed above, the information may be obtained from local sources (e.g., cache memory) and/or connected resources (e.g., social networking sites). The information may also include changing user interface behavior (e.g., object state). For example, in the "enhanced" mode described above, a possible change in behavior would be to show a remotely obtained playlist instead of the local playlist based, for example, on an event such as accessing one or more of the elements indicating additional information 412 described above in reference to FIG. 4.

At block 508, the obtained content or context information may be processed to produce, for example, content or context summary associated with the object and/or various visual indicators corresponding to the determined additional information. Processed information may include brief descriptions of the content (e.g., a Web page) or context associated with the object, and may take different forms (visual indicators): textual, photo, icons, logos, thumbnails and other types of content items. For example, visual properties of the object (size, color, etc.) may be changed so as to provide visual indicators relaying the determined additional information to the user.

At block 510, the basic information of the user interface may be enhanced (e.g., augmented) with the corresponding additional content or context summary information. For example, the content or context summary information may be placed adjacent to an object or objects in a container of the user interface. At block 512, the augmented user interface may be rendered for display on the user interface.

Figure 6:
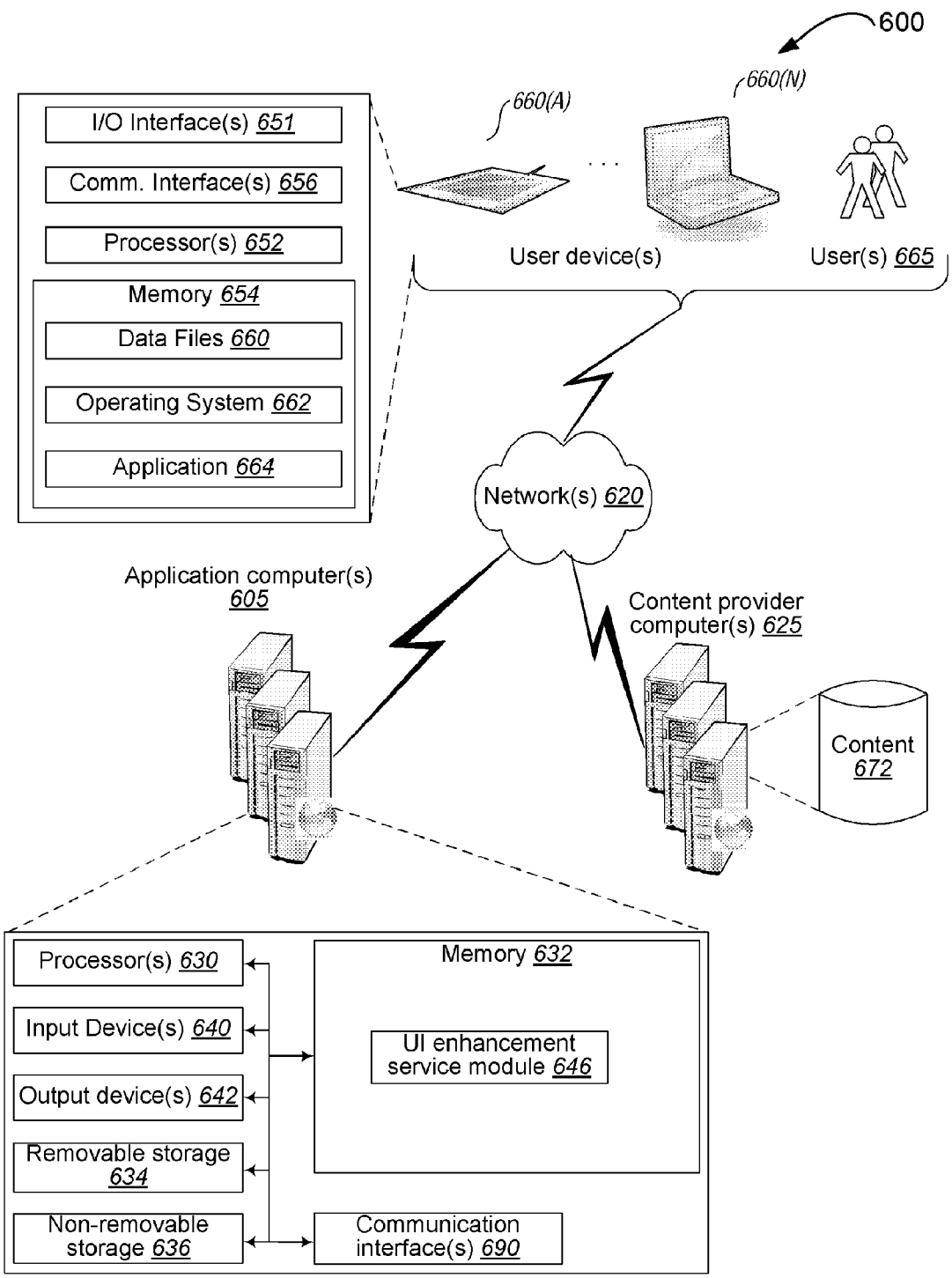
FIG. 6 illustrates an environment in which various embodiments may be implemented in accordance with some embodiments.

FIG. 6 illustrates an example of an environment (e.g., system) 600 for implementing aspects of the user interface enhancement in accordance with various embodiments. As will be appreciated, although a Web-based environment is used for purposes of explanation, different environments may be used, as appropriate, to implement various embodiments. The environment 600 includes one or more electronic client (user) devices 660(A)-660(N), which may include any appropriate device operable to send and receive requests, messages, or information over an appropriate network 620 and convey information back to a user 665 of the devices 660(A)-660(N). Examples of such client devices may include, but are not limited to, personal computers, cell phones, handheld messaging devices, laptop computers, set-top boxes, personal data assistants, electronic book readers, tablets, game consoles, and the like. These devices may also include workstations running any of a variety of commercially available operating systems and other known applications for purposes such as development and database management. These devices may also include other electronic devices, such as dummy terminals, thin-clients, gaming systems, and other devices capable of communicating via a network. The devices may be a part of entertainment systems, for example, entertainment systems used in transport systems, such as cars, trains, planes, and the like. The user devices 660(A)-660(N) may include a processor 652 and memory 654 for storing processor-executable instructions, such as data files 661, operating system 662, and one or more applications 664, such as a music player application, for example.

The devices may further include at least one or both of the following elements: input/output interface 651 designed to enable peripheral component interaction with the environment (system) 600 and communication interface 656. In various embodiments, the input/output interface 651 may include, but is not limited to, a display, e.g., a liquid crystal display, a touch screen display, etc., a speaker, a microphone, a still camera, a video camera, a flashlight (e.g., a light emitting diode flash), and a keyboard. For embodiments including a display supporting touch screen features, the system 600 may include a touchscreen controller for facilitating control of the display. As discussed above, operating system 662 and/or an application 664 may include a UI enhancement service configured to enhance a user interface of the application rendered on the user devices 660(A)-660(N).

The network 620 may include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In this example, the network includes the Internet, and the environment includes one or more Web servers (content provider servers) 625 for receiving requests and serving content in response thereto, although for other networks, an alternative device serving a similar purpose could be used, as would be apparent to one of ordinary skill in the art.

The illustrative environment (system) 600 may include at least one application server 605 including, or associated with, one or more processors 630, input devices 640, output devices 642, removable storage 634, and non-removable storage 636 that may be connected to a communication interface 690 and memory 632. As discussed above, in one embodiment, a UI enhancement service may reside on the server 605 and may execute on the client devices 660(A)-660(N) or server 605. Accordingly, the memory 632 may include a UI enhancement service module 646.

The handling of all requests and responses, for example, the requests for information initiated by the UI enhancement service, as well as the delivery of content between the client devices 660(A)-660(N) and the application server 605, may be handled by one or more content provider Web servers 625. The content data store 672 may be associated with the servers 625. The data store 672 may be operable, through logic associated therewith, to receive instructions from the servers 625 and obtain, update, or otherwise process data in response thereto. In one example, the UI enhancement service may submit a request for content associated with a particular object (or objects) of a container of the application's user interface. In embodiments, the UI enhancement service may be provided by instructions executing on user device 660(A)-660(N).

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 600 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include non-transitory media such as disk drives, optical storage devices, and solid-state storage devices, such as random access memory ("RAM") or read-only memory ("ROM"), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment 600 may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature, and not limited to the scope of the disclosure.

The embodiments described herein include a computing device-readable storage medium having executable instructions stored thereon that cause a computing device, in response to execution by the computing device, to determine additional information to augment basic information associated with at least one object of a container of a user interface of an application executing on the computing device, the additional information being associated with the at least one object and determine being performed in response to an event associated with the application, the container of the user interface of the application, or the at least one object of the container; and augment the basic information of the at least one object in a display of the container with the additional information or one or more indicators corresponding to the additional information.

The executable instructions that cause a computing device to augment the basic information of the at least one object in a display of the container further cause the computing device, in response to execution by the computing device, to change visual properties or behavior associated with the display of the container or the at least one object.

The executable instructions that cause a computing device, in response to execution by the computing device, to determine additional information further cause the computing device, in response to execution by the computing device, to collect information from at least one of a local information resource or a connected information resource, wherein the local information resource is associated with the application or a locally accessible data store and wherein the connected information resource is accessible by the computing device via a computer network.

The connected information resource may include at least one of one or more social networking resources or a server accessible by the computing device. The application may comprise an email application, the container comprises an email folder, the at least one object comprises at least one email message, and the event comprises receipt of an email communication. The additional information may include one or more attributes associated with the at least one email message, the one or more attributes including indication of importance of the email message, a name of a sender of the email message, subject information included in a subject line of the email message, or content information associated with content of the email message.

The application may be a music player application, wherein the container may include at least one playlist associated with the music player application, wherein the at least one object may comprise a media item on the at least one playlist, and wherein the event may include switching a display of the at least one from a regular mode to an enhanced mode. The additional information may include at least one of media information associated with the media item or functional characteristic associated with the media item. The media information includes user information associated with a user of the media item and wherein the functional characteristic includes a tempo measurement of the media item.

The embodiments described herein further include a computing device comprising a processor and a user interface enhancement application operated by the processor, to: detect an event associated with an application executing on the computing device, a container of a user interface of the application, or at least one object of the container; determine additional information to augment basic information associated with the at least one object of the container of the user interface of the application, the additional information being associated with the at least one object; and augment the basic information of the at least one object in a display of the container with the additional information or one or more indicators corresponding to the additional information.

The user interface enhancement application may be further operated by the processor to change visual properties or behavior associated with the display of the container or the at least one object or to collect the additional information from at least one of a local information resource or a connected information resource.

The event associated with the application may include at least one of receipt of an email message or access of the at least one object, wherein the object may be an email folder and the application may be an email application. Connected information resource may include a Web site and the additional information may comprise content associated with the Web site.

The application may be a music player application, wherein the container may include at least one playlist associated with the music player application, wherein the at least one object may comprise a media item on the at least one playlist, and wherein the event may include switching a display of the at least one playlist from a regular mode to an enhanced mode. The additional information may include at least one of social information associated with the media item or functional characteristic associated with the media item.

The user interface enhancement application may be further operated by the processor to render for display the user interface enhanced by augmenting the basic information of the at least one object with the visual indicators. The computing device may be selected from one of: a smartphone, a mobile Internet device, a laptop computer, a desktop computer, a server, a set-top box, or a game console, and entertainment systems associated with transport systems.

The embodiments described herein further include a computer-implemented method for enhancing user interface of an application, the method comprising: detecting, with a computing device, an event associated with an application executing on the computing device, a container of a user interface of the application, or at least one object of the container; determining, with the computing device, additional information to augment basic information associated with the at least one object of the container of the user interface of the application, the additional information being associated with the at least one object; and augmenting, with the computing device, the basic information of the at least one object in a display of the container with the additional information or one or more indicators corresponding to the additional information.

The method may further comprise changing visual properties associated with the display of the container or the at least one object and collecting the additional information from at least one of a local information resource or a connected information resource. The local resource may be a cache memory associated with the computing device. The connected information resource may include at least one Web site, a data store on a server accessible by the computing device, or a collection of data stored on a different computing device and accessible by the computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

What is claimed is:

1. At least one non-transitory computing device-readable storage medium having executable instructions stored thereon that cause a computing device, in response to execution by the computing device, to:
   detect an event associated with at least one object of a container of a user interface of an application executing on the computing device, wherein the event is associated with a first relevance level; and
   in response to a detection of the event, determine additional information to augment basic information associated with the at least one object of the container, wherein the additional information is associated with the at least one object, wherein the object was present in the user interface prior to the detection of the event; and
   switch from a regular mode of display of the at least one object to an enhanced mode of display of the object, wherein to display in the enhanced mode includes to augment the basic information of the at least one object in a display of the container with the additional information or one or more indicators corresponding to the additional information, and to de-emphasize, using visual indicators, at least another one of the objects having a second relevance level, wherein the first relevance level is higher in relevance than the second relevance level, wherein to de-emphasize includes to make a first name of the at least another one of the objects appear smaller than a second name of the at least one object.

2. The computing device-readable storage medium of claim 1, wherein the executable instructions that cause a computing device to augment the basic information associated with the at least one object further cause the computing device, in response to execution by the computing device, to change behavior associated with the display of the at least one object.

3. The computing device-readable storage medium of claim 1, wherein the executable instructions that cause a computing device, in response to execution by the computing device, to determine additional information further cause the computing device, in response to execution by the computing device, to collect information from at least one of a local information resource or a connected information resource, wherein the local information resource is associated with the application or a locally accessible data store and wherein the connected information resource is accessible by the computing device via a computer network.

4. The computing device-readable storage medium of claim 3, wherein the connected information resource includes at least one of one or more social networking resources or a server accessible by the computing device.

5. The computing device-readable storage medium of claim 1, wherein the application comprises an email application, the container comprises a pane, the at least one object comprises an email folder, and the event comprises an email message.

6. The computing device-readable storage medium of claim 5, wherein the additional information includes one or more attributes associated with the at least one email message, the one or more attributes including indication of importance of the email message, a name of a sender of the email message, subject information included in a subject line of the email message, or content information associated with content of the email message.

7. The computing device-readable storage medium of claim 1, wherein the application is a music player application, wherein the container includes at least one playlist associated with the music player application, wherein the at least one object comprises a media item on the at least one playlist, and wherein the event includes switching a display of the at least one playlist from a regular mode to an enhanced mode.

8. The computing device-readable storage medium of claim 7, wherein the additional information includes at least one of media information associated with the media item or functional characteristic associated with the media item.

9. The computing device-readable storage medium of claim 8, wherein the media information includes user information associated with a user of the media item and wherein the functional characteristic includes a tempo measurement of the media item.

10. A computing device comprising:
a processor; and
a user interface enhancement application operated by the processor, to:
detect an event associated with at least one object of a container of a user interface of an application executing on the computing device, wherein the object was present in the user interface prior to the detection of the event, wherein the event is associated with a first relevance level; and
in response to detection, determine additional information to augment basic information associated with the at least one object of the container of the user interface of the application, wherein the additional information is associated with the at least one object; and
switch from a regular mode of display of the at least one object to an enhanced mode of display of the object, wherein to display in the enhanced mode includes to augment the basic information of the at least one object in a display of the container with the additional information or one or more indicators corresponding to the additional information, and to de-emphasize, using visual indicators, at least another one of the objects having a second relevance level, wherein the first relevance level is higher in relevance than the second relevance level, wherein to de-emphasize includes to make a first name of the at least another one of the objects appear smaller than a second name of the at least one object.

11. The computing device of claim 10, wherein the user interface enhancement application is further operated by the processor to change behavior associated with the display of the at least one object.

12. The computing device of claim 10, wherein the user interface enhancement application is further operated by the processor to collect the additional information from at least one of a local information resource or a connected information resource.

13. The computing device of claim 10, wherein the event associated with the application includes at least one of receipt of an email message or access of the at least one object, wherein the object is an email folder and the application is an email application.

14. The computing device of claim 13, wherein the additional information includes one or more attributes associated with the at least one email message, the one or more attributes including indication of importance of the email message, a name of a sender of the email message, subject information included in a subject line of the email message, or content information associated with content of the email message.

15. The computing device of claim 12, wherein connected information resource includes a Web site and wherein the additional information comprises content associated with the Web site.

16. The computing device of claim 10, wherein the application is a music player application, wherein the container includes at least one playlist associated with the music player application, wherein the at least one object comprises a media item on the at least one playlist, and wherein the event includes switching a display of the at least one playlist from a regular mode to an enhanced mode.

17. The computing device of claim 16, wherein the additional information includes at least one of social information associated with the media item or functional characteristic associated with the media item.

18. The computing device of claim 10, wherein the user interface enhancement application is further operated by the processor to process the additional information to produce the visual indicators corresponding to the additional information.

19. The computing device of claim 18, wherein the user interface enhancement application is further operated by the processor to render for display the user interface enhanced by augmenting the basic information of the at least one object with the visual indicators.

20. The computing device of claim 10, wherein the computing device is selected from one of: a smartphone, a mobile Internet device, a laptop computer, a desktop computer, a server, a set-top box, or a game console, and entertainment systems associated with transport systems.

21. A computer-implemented method for enhancing user interface of an application, the method comprising:
detecting, by a computing device, an event associated with at least one object of a container of a user interface of an application executing on the computing device, wherein the object was present in the user interface prior to the detection of the event, wherein the event is associated with a first relevance level; and
in response to detecting the event, determining, by the computing device, wherein additional information to augment basic information is associated with the at least one object of the container of the user interface of the application, wherein the additional information is associated with the at least one object; and
switching, by the computing device, from a regular mode of display of the at least one object to an enhanced mode of display of the object, wherein displaying in the enhanced mode includes augmenting, by the computing device, the basic information of the at least one object in a display of the container with the additional information or one or more indicators corresponding to the additional information, and de-emphasizing, by the computing device, using visual indicators, at least another one of the objects having a second relevance level, wherein the first relevance level is higher in relevance than the second relevance level, wherein de-emphasizing includes making a first name of the at least another one of the objects appear smaller than a second name of the at least one object.

22. The computer-implemented method of claim 21, further comprising: changing, by the computing device, behavior associated with the display of the at least one object.

23. The computer-implemented method of claim 21, further comprising: collecting, by the computing device, the additional information from at least one of a local information resource or a connected information resource.

24. The computer-implemented method of claim 23, wherein the local resource is a cache memory associated with the computing device.

25. The computer-implemented method of claim 23, wherein the connected information resource includes at least one Web site, a data store on a server accessible by the computing device, or a collection of data stored on a different computing device and accessible by the computing device.

* * * * *